(12) United States Patent
Dubosc

(10) Patent No.: US 11,920,386 B2
(45) Date of Patent: Mar. 5, 2024

(54) AIRCRAFT DOOR WITH VERTICAL CONTROL MECHANISM

(71) Applicant: LATECOERE, Toulouse Occitaine (FR)

(72) Inventor: Gregory Dubosc, Girolles Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 46 days.

(21) Appl. No.: 17/618,994

(22) PCT Filed: Jun. 12, 2020

(86) PCT No.: PCT/EP2020/025275
§ 371 (c)(1),
(2) Date: Dec. 14, 2021

(87) PCT Pub. No.: WO2020/253986
PCT Pub. Date: Dec. 24, 2020

(65) Prior Publication Data
US 2022/0412132 A1    Dec. 29, 2022

(30) Foreign Application Priority Data

Jun. 15, 2019 (FR) ...................................... 1906436

(51) Int. Cl.
*E05B 83/36* (2014.01)
*B64C 1/14* (2006.01)

(52) U.S. Cl.
CPC ............ *E05B 83/36* (2013.01); *B64C 1/1423* (2013.01); *B64C 1/1461* (2013.01)

(58) Field of Classification Search
CPC ..... B64C 1/1423; B64C 1/1461; B64C 1/143; B64C 1/1438; E05B 83/36
See application file for complete search history.

(56) References Cited

U.S. PATENT DOCUMENTS

| 2,751,636 | A | * | 6/1956 | Varnell | ................. | B64C 1/1407 16/370 |
| 3,791,073 | A | * | 2/1974 | Baker | ................... | B64C 1/1407 49/40 |
| 4,720,065 | A | * | 1/1988 | Hamatani | ............... | B64C 1/143 244/905 |
| 4,854,010 | A | | 8/1989 | Maraghe | | |

(Continued)

FOREIGN PATENT DOCUMENTS

RU    2548644    4/2015

*Primary Examiner* — Joshua J Michener
*Assistant Examiner* — Cindi M Curry
(74) *Attorney, Agent, or Firm* — Defillo & Associates, Inc.; Evelyn A. Defillo

(57) ABSTRACT

Aircraft door including a support arm (10) connecting a door leaf (5) and a door frame (13), the locking/unlocking mechanism of which includes: a control shaft (17) extending along a substantially vertical axis; a guide track (29); an actuating finger (32) attached to the support arm (10); the locking/unlocking mechanism having: an actuating configuration in which the actuating finger (32) is inserted into the guide track (29), the rotation of the control shaft (17) causing the actuating finger (32) to move along the guide track (29); a release configuration in which the actuating finger (32) is outside the guide track (29).

17 Claims, 7 Drawing Sheets

(56) References Cited

U.S. PATENT DOCUMENTS

| | | | |
|---|---|---|---|
| 2020/0079489 A1* | 3/2020 | Lieven | B64C 1/143 |
| 2021/0070416 A1* | 3/2021 | Buchet | B64C 1/143 |
| 2021/0387713 A1* | 12/2021 | Dubosc | B64C 1/1438 |
| 2022/0348304 A1* | 11/2022 | Capron | E05D 15/34 |
| 2022/0363364 A1* | 11/2022 | Dubosc | B64C 1/143 |

* cited by examiner

AIRCRAFT DOOR WITH VERTICAL CONTROL MECHANISM

CROSS REFERENCE TO RELATED APPLICATION

This application is a national stage entry of PCT/EP2020/025275 filed Jun. 12, 2020, under the International Convention and claiming priority over French Patent Application No. FR1906436 filed Jun. 15, 2019.

TECHNICAL FIELD

The invention relates to the field of aeronautics and relates more particularly to aircraft doors and their locking and unlocking mechanisms.

An aircraft generally has several openings in its fuselage, to allow access to the cabin or to the holds. These openings are fitted with doors, the locking/unlocking mechanism of which must ensure the solidity of the locking and the tightness of this door during the flight. In addition, opening must be simple and quick to perform by flight personnel from inside the aircraft, or by rescue teams from outside. Resistance to the pressure difference between the interior of the cabin and the exterior of the aircraft is achieved by means of stops installed on the peripheries of the leaf of the door and of its frame.

PRIOR ART

Known aircraft doors generally comprise:
- a leaf comprising a door structure, an external wall fixed to the door structure, and door stops;
- a surround comprising a door frame intended to be fixed to the fuselage of the aircraft, the door frame comprising frame stops;
- a support arm connected to the leaf and comprising one end mounted to pivot on the door frame, this support arm and the leaf being movable between: a closed position in which the leaf closes the door frame, the door stops being locked against the frame stops; an unlocking position in which the door stops are released from the frame stops; and an open position in which the leaf is disengaged from the door frame;
- a locking/unlocking mechanism adapted to control the passage from the closed position to the unlocking position, and vice versa, this locking/unlocking mechanism comprising, for its actuation, an internal lever and an external lever, these levers being mounted on the door structure and being movable between a locking position and an unlocking position.

Different opening and closing systems exist for aircraft doors.

A first type of system consists, in opening, first of raising or lowering the door, vertically, to release the door stops from the frame stops, then in applying a circular translational movement to it to release it from its frame parallel thereto.

Another type of system consists first of all in carrying out a first pivoting about a first virtual axis passing through the vertical median of the door then, in a second step, the door is pivoted about hinges placed along an axis coinciding with a vertical edge of the frame, which results in a final door position with its internal part facing outward.

DISCLOSURE OF THE INVENTION

The object of the invention is to improve the aircraft doors of the prior art and in particular their locking/unlocking mechanisms.

To this end, the invention is aimed at an aircraft door comprising:
- a leaf comprising a door structure, an external wall fixed to the door structure, and door stops;
- a surround comprising a door frame intended to be fixed to the fuselage of the aircraft, the door frame comprising frame stops;
- a support arm connected to the leaf and comprising one end mounted to pivot on the door frame, this support arm and the leaf being movable between: a closed position in which the leaf closes the door frame, the door stops being locked against the frame stops; an unlocking position in which the door stops are released from the frame stops; and an open position in which the leaf is disengaged from the door frame;
- a locking/unlocking mechanism adapted to control the passage from the closed position to the unlocking position, and vice versa, this locking/unlocking mechanism comprising for its actuation an internal lever and an external lever, these levers being mounted on the door structure and being movable between a locking position and an unlocking position.

In this aircraft door, the locking/unlocking mechanism comprises:
- a control shaft extending along a substantially vertical axis, the control shaft being mounted on the door structure in a pivot connection about the axis of the control shaft, the internal lever and the external lever being connected to the control shaft while extending transversely to the control shaft so that an action on one of the levers causes the control shaft to rotate about its axis;
- a guide track extending in a plane substantially orthogonal to the control shaft, this guide track comprising at its end an opening;
- an actuating finger fixed to the support arm, this actuating finger being adapted to cooperate with the guide track;
A mechanical transmission adapted to cause a movement of the actuating finger when the control shaft is actuated in rotation.

In this aircraft door, the locking/unlocking mechanism has:
- an actuation configuration corresponding to the angular travel of the levers between their locking position and their unlocking position, in which configuration the actuating finger is inserted into the guide track, the rotation of the control shaft causing a movement of the actuating finger along the guide track;
- a release configuration in which the levers are in the unlocking position, in which configuration the actuating finger is movable between a first position where the actuating finger is arranged at the level of the opening of the guide track, and a second position where the actuating finger is outside the guide track, the leaf then being in the open position.

The axis in which the control shaft extends is said to be "substantially vertical" to denote the fact that the control shaft extends in a vertical direction rather than in a horizontal direction. This control shaft extends vertically as opposed to the control shafts which extend in a horizontal plane, whether this is parallel to the longitudinal axis of the aircraft, or transversely to the longitudinal axis of the aircraft.

According to the invention, in the most common case, the control shaft can be strictly vertical and this arrangement is the most convenient for the user. However, since aircraft fuselages are commonly of circular general cross section, the position of the door on the fuselage can cause the door to be inclined relative to the vertical, and the control shaft can then be inclined to follow the inclination of the door due to the curvature of the fuselage. However, such a control shaft remains defined, within the meaning of the present invention, as substantially vertical insofar as when the user stands in front of the aircraft door to open or close it, the control shaft extends well in front of said user in an up/down direction and not in a right/left direction or a forward/backward direction (the up/down, right/left, and forward/back directions are defined with respect to the user facing the door). The definition of the axis in which the control shaft extends, termed "substantially vertical", therefore excludes the so-called horizontal shafts which are parallel to the longitudinal axis of the aircraft or which are orthogonal to the longitudinal axis of the aircraft but perpendicular to the leaf.

The invention implements aircraft door opening and closing kinematics by way of a mechanism that is much simpler than the mechanisms of the prior art. This kinematics allow a simple mechanical implementation while offering great freedom in the possible movements for the leaf during the opening or closing sequences. The shape of the guide path can provide for different ranges to be travelled over by the actuating finger, depending on the desired movements for the leaf and relative to the chosen opening and closing strategy.

According to a preferred feature, the aircraft door is said to be "a lateral escape door", which means that the door unlocks by virtue of lateral movements of the leaf allowing the release of the door stops relative to the frame stops, without resorting to vertical movements of the leaf. The kinematics provided for by the invention are particularly suitable for this opening and closing strategy. In this case, although the opening and closing movements may appear more complex than, for example, a door of the prior art with vertical unlocking movement, this arrangement allows a drastic simplification of the locking/unlocking mechanism, with the associated cost, weight and reliability gains.

The guide track combines the functions of defining the movements imparted on the leaf with the functions of locking the stops. Indeed, the invention limits the number of guides which are provided with cams and rollers which fit into one another, generally by means of vertical movements of the leaf. The number of guides of the doors of the prior art, making them complex, heavy and expensive, is reduced by the cooperation of the actuating finger with the guide track. The invention eliminates the need for any vertical movement of the leaf and allows the locking and unlocking of the stops only by lateral movements. The door and frame guides can thus be simplified, lightened and made more reliable.

A significant reduction in the overall cost of such an aircraft door is obtained with a mechanism and a reduced number of guides. The aircraft door according to the invention also has negligible intrusion to the interior of the aircraft during the opening and closing sequences.

According to another object, the invention is aimed at a method for locking/unlocking an aircraft door as described above and in which, in the actuation configuration:
  the actuating finger travels over a first range of the guide track causing a movement of mutual drawing together of the support arm and the leaf as well as a mutual lateral displacement movement of the support arm and the leaf, so that the leaf is moved inwardly and in a lateral direction in a first direction, releasing a first assembly of door stops relative to the frame stops;
  the actuating finger travels over a second range of the guide track causing a movement of mutual distancing of the support arm and the leaf, so that the leaf is moved outward;
  the actuating finger travels over a third range of the guide track along a path causing a mutual lateral displacement movement of the support arm and the leaf, so that the leaf is moved in a lateral direction in a second direction, by releasing a second assembly of door stops relative to the frame stops.

The aircraft door may have the following additional features, alone or in combination:
  the mechanical transmission comprises a fork arranged opposite the guide track and connected to the control shaft, and in that, in the actuation configuration, the pivoting of the fork causes a movement of the actuating finger along the guide track;
  the fork extends in a plane substantially orthogonal to the control shaft, and in that the fork is pivotally mounted on the door structure about an axis substantially parallel to the control shaft;
  in the actuation configuration, the actuating finger is inserted both into the guide track and into the fork;
  the actuating finger is mounted on an actuating arm integral with the support arm, the actuating arm being arranged between the fork and the guide track, the actuating finger comprising a double roller extending transversely on either side of the actuating arm;
  the fork comprises two actuating branches and an opening at its end, and, in the release configuration, the opening of the fork is arranged opposite the opening of the guide track;
  the mechanical transmission comprises a cam coupled in rotation with the control shaft;
  the mechanical transmission comprises a connecting rod connecting the cam to the fork and adapted to cause the pivoting of the fork during the rotation of the cam and the control shaft;
  the cam comprises a cam track, and in that the connecting rod has at one of its ends a roller inserted into the cam track;
  the cam track comprises: a first range extending in an arc of a circle centered on the control shaft, the actuating finger not being driven in movement by the rotation of the control shaft when the roller travels over this first range; a second range in which the actuating finger is driven in movement by the rotation of the control shaft when the roller travels over this second range;
  the mechanical transmission comprises a guide lever rotatably mounted on the door structure and in pivot connection with the roller;
  the connecting rod is connected to the pivot axis of the fork by a connecting rod;
  the support arm is connected to the leaf via a support forearm which is in pivot connection with the support arm and with the door structure, the leaf thus being movable relative to the door frame in a longitudinal direction and a transverse direction;
  the door comprises a pivot arm connected to the leaf and connected to the door frame by a pivot connection, and adapted to cause the pivoting of the leaf about a substantially vertical axis;
  The door stops and the frame stops are arranged on the lateral edges of the door, the door stops being locked against the frame stops by a flat-on-flat contact when the door is in the closed position;

the guide track comprises a range of which the orientation causes a movement of the guide finger causing a mutual drawing together of the support arm and the leaf;

the guide track comprises a range of which the orientation causes a movement of the guide finger causing a mutual distancing of the support arm and the leaf;

the guide track comprises a range of which the orientation causes a movement of the guide finger causing a mutual lateral movement of the support arm and the leaf.

DESCRIPTION OF THE FIGURES

Other features and advantages of the invention will emerge from the nonlimiting description which follows, with reference to the appended drawings in which.

DETAILED DESCRIPTION OF THE INVENTION

FIGS. 1 to 6 are schematic figures illustrating the movement of an aircraft door according to the invention. This aircraft door has a so-called "lateral escape" operation, which means that the door unlocks by virtue of lateral movements of the leaf allowing the release of the door stops relative to the frame stops. These lateral movements are here defined as movements in a longitudinal direction X parallel to the longitudinal axis of the aircraft.

FIGS. 1 to 6 schematically illustrate the operations allowing the opening of the aircraft door. The closing of this aircraft door takes place by the same operations carried out in the reverse order.

Figure 1:
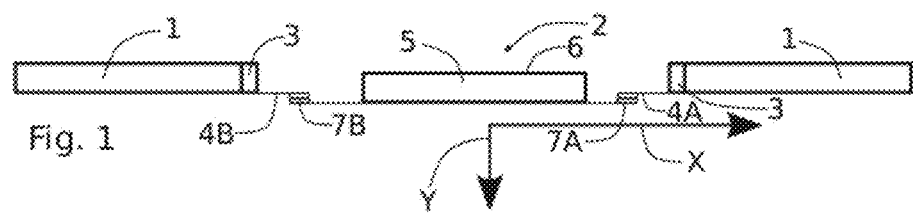
FIG. 1 illustrates an aircraft door according to the invention, in the closed position.

FIG. 1 schematically shows a portion of the fuselage 1 of an aircraft as well as a door 2. The door 2 comprises a surround consisting here of a door frame 3 which is fixed to the fuselage 1 and which is provided with frame stops 4. The door 2 also comprises a leaf 5 which is provided with an external wall 6 facing the outside of the aircraft, as well as door stops 7.

In this schematic view of FIG. 1, the fuselage portion 1 and the door 2 are seen from above, in section in a horizontal plane. The arrow X in FIG. 1 illustrates the longitudinal axis of the aircraft, and points toward the front of the aircraft. The arrow Y illustrates the transverse axis of the aircraft and is pointed toward the interior of the aircraft. The frame stops thus comprise front frame stops 4A and rear frame stops 4B. Likewise, the door stops comprise front door stops 7A and rear door stops 7B.

In the position of FIG. 1, the door 2 is in the closed position, the leaf 5 closing the door frame 3, this closure being locked by the door stops 7 acting against the frame stops 4, by a flat-on-flat contact. This locked position allows the flight of the aircraft.

From this closed position of FIG. 1, the method for opening the door 2 is illustrated with reference to FIGS. 2 to 6. In these figures, the movement of the leaf is indicated by the arrows D and the components of the action which is transmitted to the leaf 5 by the locking/unlocking mechanism, and which allows the movement D, is indicated by the reference M.

Figure 2:
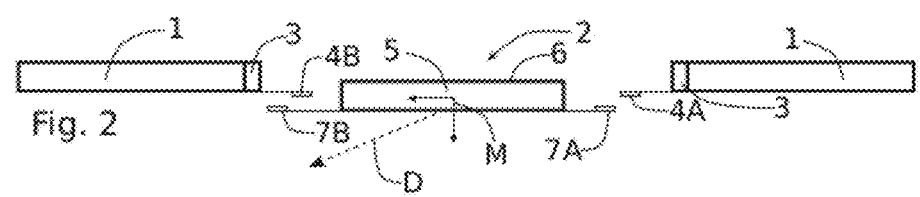
FIG. 2 illustrates a first step of a sequence for opening the door of FIG. 1.

A first movement, illustrated in FIG. 2 and controlled by the locking/unlocking mechanism, drives the leaf 5 toward the interior of the aircraft and toward the rear. The door stops 7 are thus located away from the frame stops 4 in the transverse direction Y. In addition, the front door stops 7A are released from the front frame stops 4A, that is to say that the front door stops 7A are no longer opposite the front frame stops 4A, the front frame stops 4A therefore no longer preventing the front door stops 7A from moving toward the outside of the aircraft. This movement D of the leaf is possible by virtue of forces transmitted to the leaf by the locking/unlocking mechanism in the two directions M.

Figure 3:
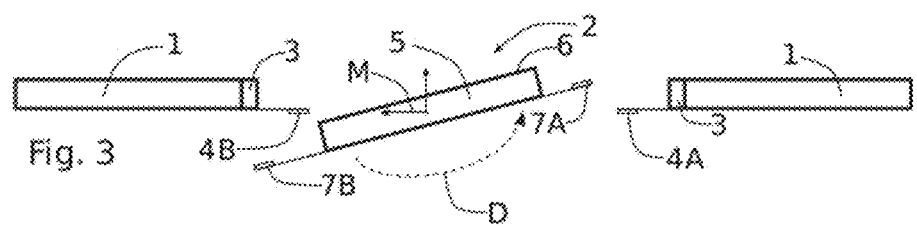
FIG. 3 illustrates a second step of a sequence for opening the door of FIG. 1.

Following a second movement D illustrated in FIG. 3, the leaf 5 is pivoted about a vertical axis so that the front door stops 7A are moved toward the outside of the aircraft, beyond the level of the front frame stops 4A. This rotational movement D of the leaf is possible by virtue of forces transmitted to the leaf by the locking/unlocking mechanism in the two directions M.

Figure 4:
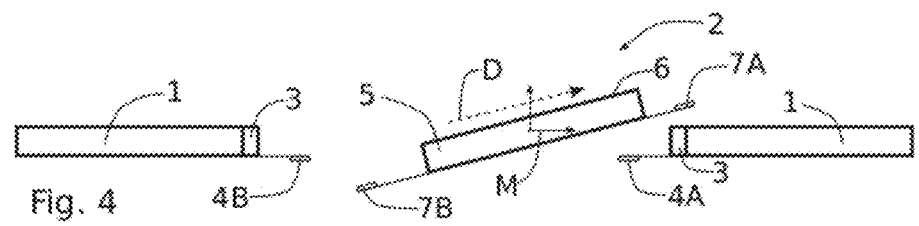
FIG. 4 illustrates a third step of a sequence for opening the door of FIG. 1.

Following a third movement D illustrated in FIG. 4, the leaf 5 is then translated forward in its own plane, that is to say that the leaf 5 undergoes a translation along a direction extending between a rear stop 7B and a front stop 7A. This movement D then makes it possible to release the rear door stops 7B relative to the rear frame stops 4B. The door stops 7B are no longer opposite the frame stops 4B and the movement of the leaf 5 toward the outside of the aircraft is no longer hampered by any stop. This rotational movement D of the leaf is possible by virtue of forces transmitted to the leaf by the locking/unlocking mechanism in the two directions M.

Figure 5:
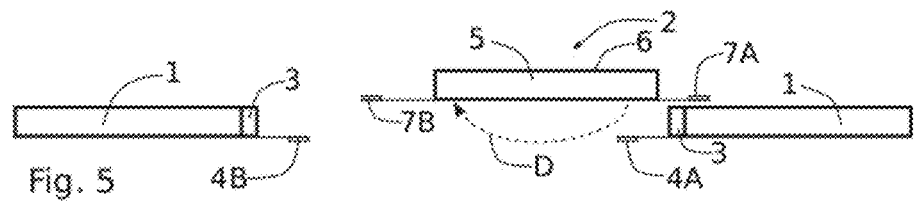
FIG. 5 illustrates a fourth step of a sequence for opening the door of FIG. 1.

In a fourth movement D illustrated in FIG. 5, the leaf 5 undergoes a rotation about a vertical axis so that it finds an orientation parallel to the fuselage 1. This rotational movement here does not require any transmission of forces from the locking/unlocking mechanism, since it does not require movement of the door support arm. This rotational movement can be achieved by a device allowing the orientation of the door, such as a pivot arm described below.

Figure 6:
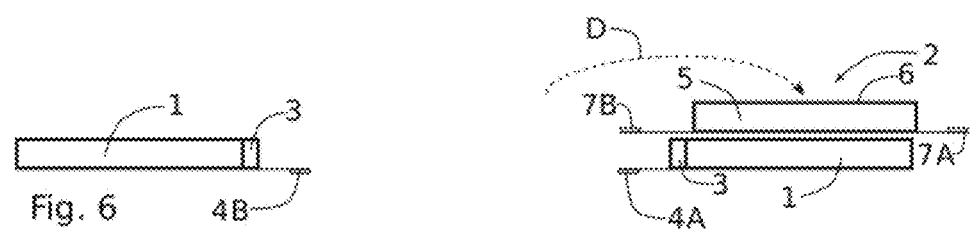
FIG. 6 illustrates a fifth step of a sequence for opening the door of FIG. 1.

During a last opening movement D, illustrated in FIG. 6, the leaf 5 is driven in a circular translation which positions the leaf 5 against the fuselage 1, keeping the leaf 5 parallel to the fuselage 1 and completely releasing the frame 3 to allow access to the aircraft. In the position of FIG. 6, the aircraft door is in the open position.

The method for closing the door 2 takes place in the opposite direction from the position of FIG. 6 to the position of FIG. 1.

The opening and closing of the door 2 as well as the corresponding locking and unlocking operations of the stops 4, 7 are carried out only with operations: of lateral translations of the leaf 5 (along the X axis); transverse translations (along the Y axis) of the leaf 5; and rotations of the leaf 5 about a vertical axis. The leaf 5 is movable only in a horizontal plane, the leaf 5 being fixed in the vertical direction.

Figure 7:
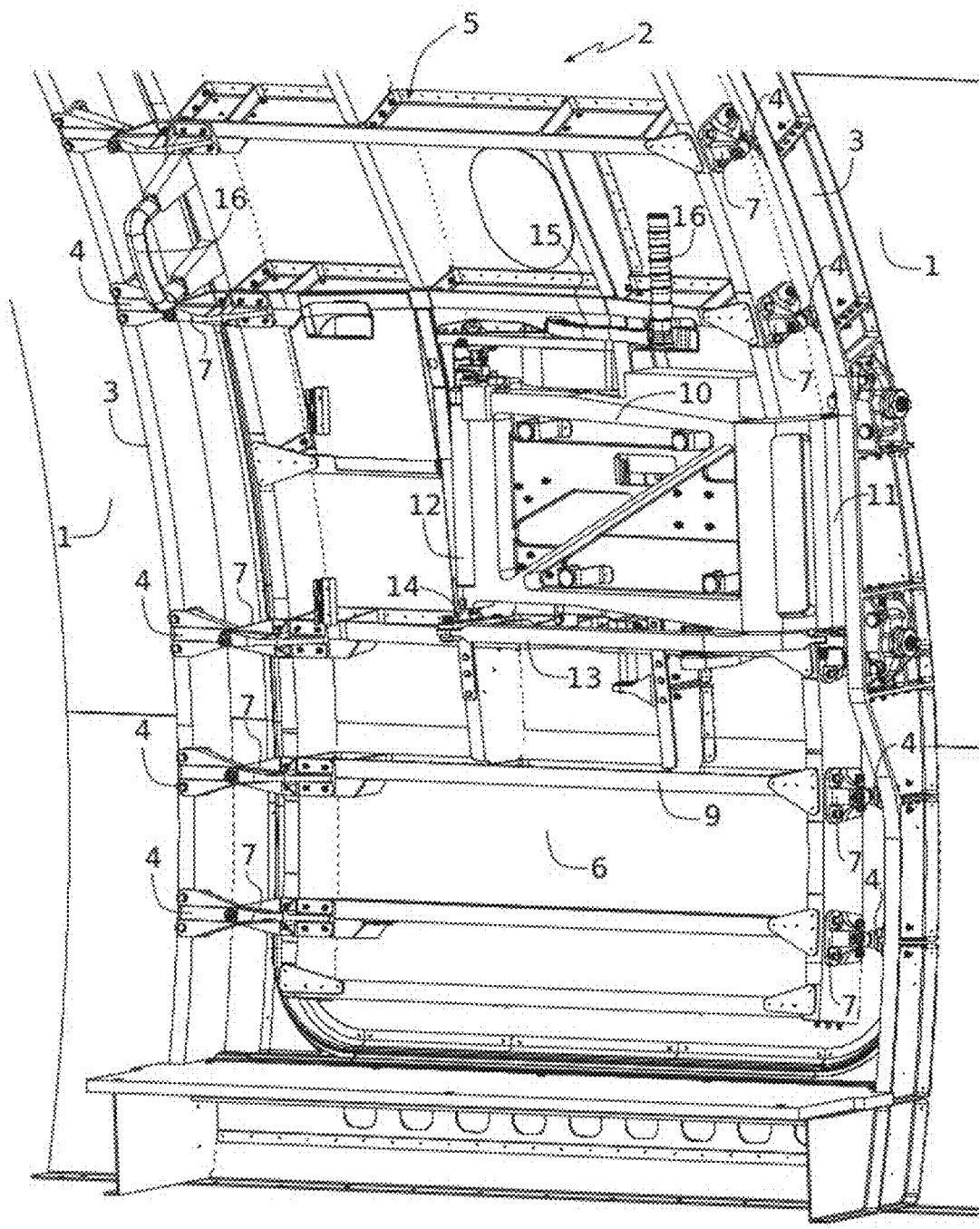
FIG. 7 is a general view of an aircraft door according to the invention.

FIG. 7 shows the aircraft door 2 in the closed position (position of FIG. 1) and seen from inside the aircraft.

The door frame 3 is shown attached to the fuselage 1, the frame stops 4 being bolted to two lateral uprights of the door frame 3.

The leaf 5 comprises a door structure 9 generally composed of beams and longitudinal members. The external wall 6 of the leaf 5 is fixed to the door structure 9. The door stops 7 are also bolted to the door structure 9.

The door 2 further comprises a support arm 10 connected to the leaf 5 and rotatably mounted on the frame 3 by a pivot connection 11. The support arm 10 allows the movements of the leaf 5 relative to the fuselage 1, to allow the opening and closing of the door, supporting the weight of the leaf 5. The support arm 10 can be connected directly to the door structure 9, or by means of one or more forearms, or slides, or any other type of connection depending on the possible movements desired between the leaf 5 and the support arm 10. In the present example, the support arm 10 is connected, by its end opposite the pivot connection 11, to a forearm 12. The support arm 10 is connected by a pivot connection to the forearm 12, the latter itself being connected by a pivot connection to the door structure 9. By virtue of this assembly:
- a mutual drawing together or distancing movement of the support arm 10 and of the leaf 5 causes a movement of the leaf 5 toward the interior or the exterior of the aircraft;
- a lateral mutual translational movement of the support arm 10 and of the leaf 5 causes a lateral movement of the leaf 5 toward the front or toward the rear of the aircraft.

These movements are advantageously combined by virtue of the possible rotation between the support arm 10 and the support forearm 12.

The door 2 also comprises a pivot arm 13 and a pivot forearm 14 which are interconnected by a pivot connection. The pivot arm 13 is also connected by a pivot connection to the door frame 3, and the pivot forearm 14 is connected by a pivot connection to the door structure 9. The pivot arm 13 and the pivot forearm 14 make it possible to orient the leaf 5 when the latter is moved by the support arm 10 and in particular make it possible to control the pivoting movements of the leaf 5 about a vertical axis.

The door 2 further comprises a locking/unlocking mechanism of which only the external lever 15 is visible in FIG. 7. In this FIG. 7, the external lever 15 is in the locking position. From this position, the external lever 15 can be actuated in rotation about a vertical axis to an unlocking position in which the door stops 7 are released from the frame stops 4 (position of FIG. 5), and in which the leaf 5 is released from the locking/unlocking mechanism and can be manually pushed outward to its open position (position of FIG. 6). The door 2 further comprises a handle 16 allowing manual manipulation of the leaf 5 when it is thus released from the locking/unlocking mechanism.

The locking/unlocking mechanism of the door 2 will now be described with reference to FIGS. 8, 9 and 10.

Figure 8:
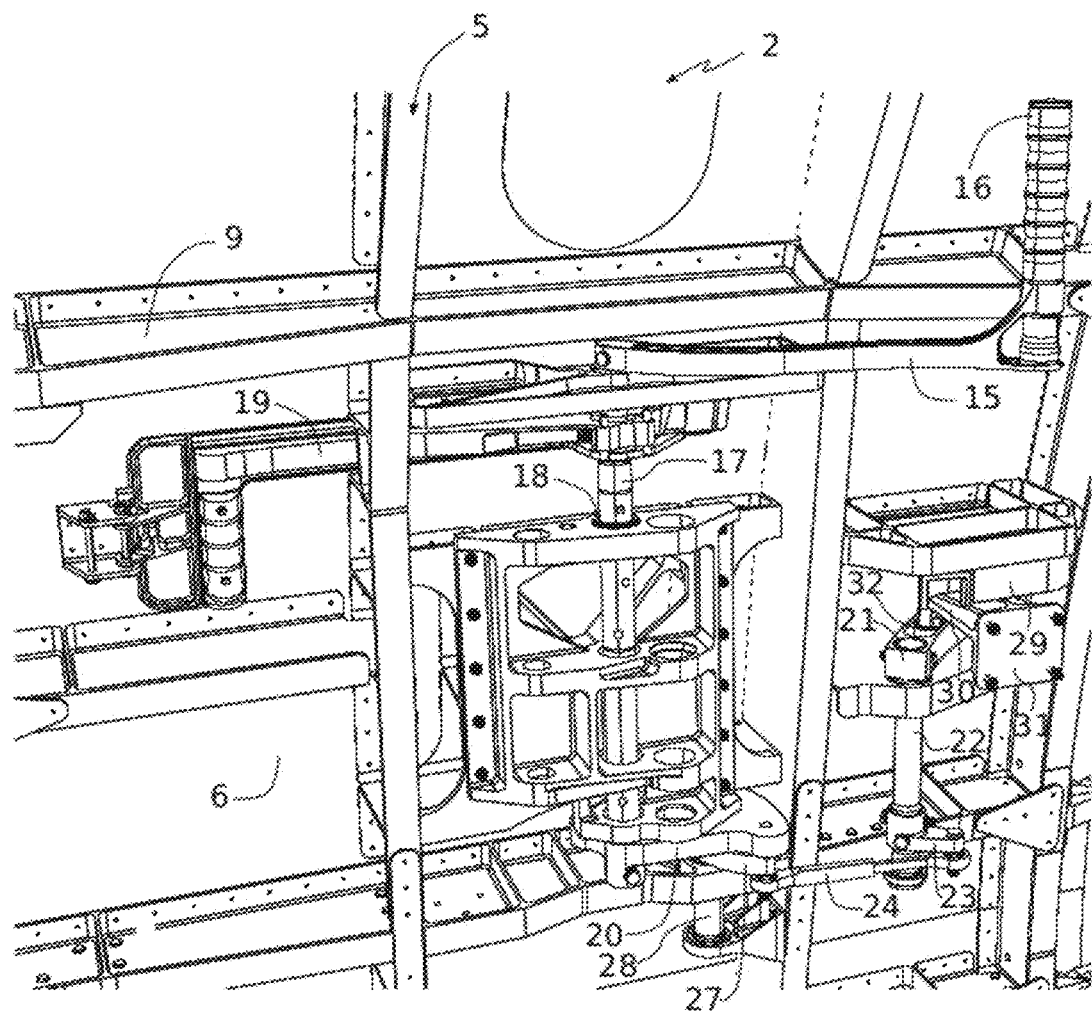
FIG. 8 is an enlarged view of the aircraft door of FIG. 7.

FIG. 8 is an enlarged view of FIG. 7. In this FIG. 8, the support arm 10 has not been shown to reveal the elements of the locking/unlocking mechanism which are located behind the support arm 10. Other elements such as the pivot arm 13, its forearm 14, and various cowls have not been shown to simplify the figure.

Figure 9:
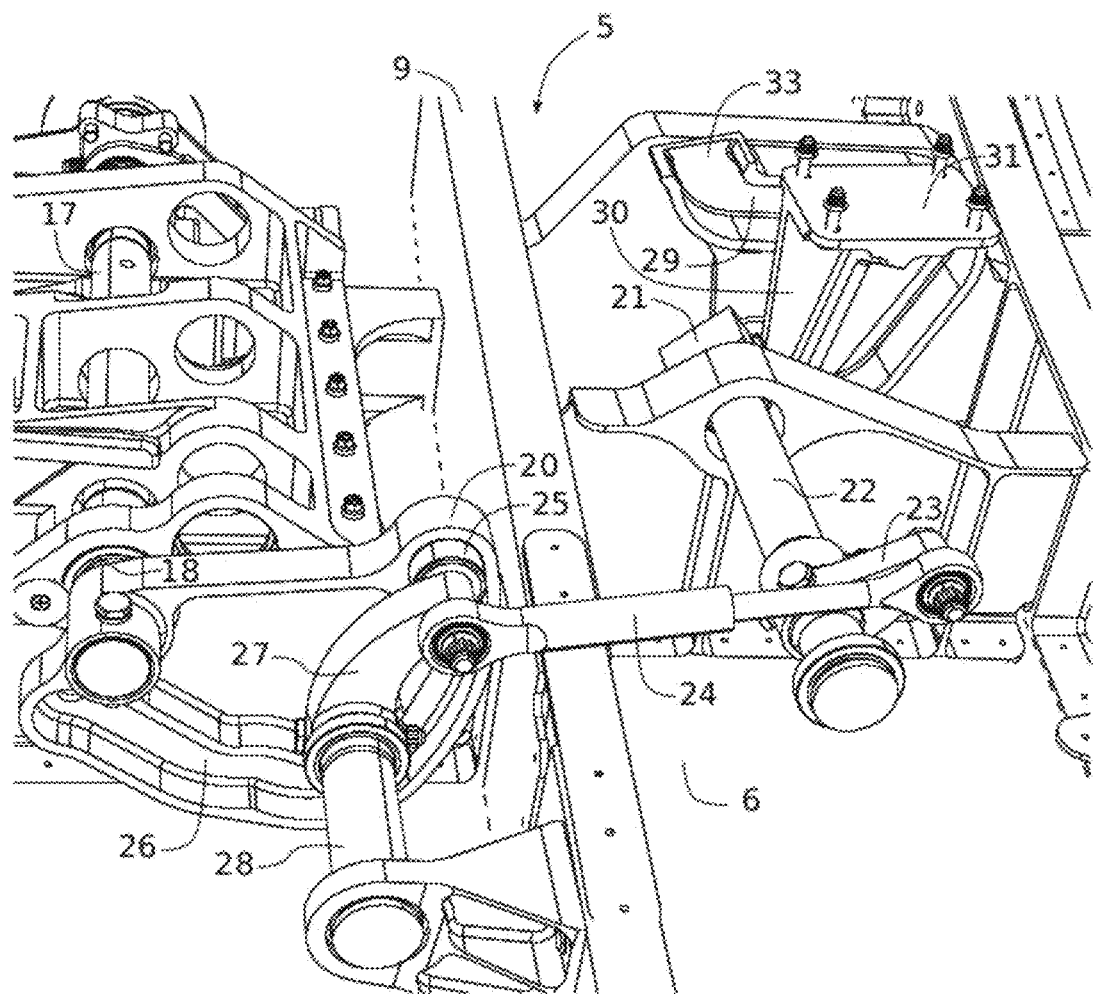
FIG. 9 is a bottom-up view of FIG. 8.

FIG. 9 is a perspective view, from below, of a portion of FIG. 8.

Figure 10:
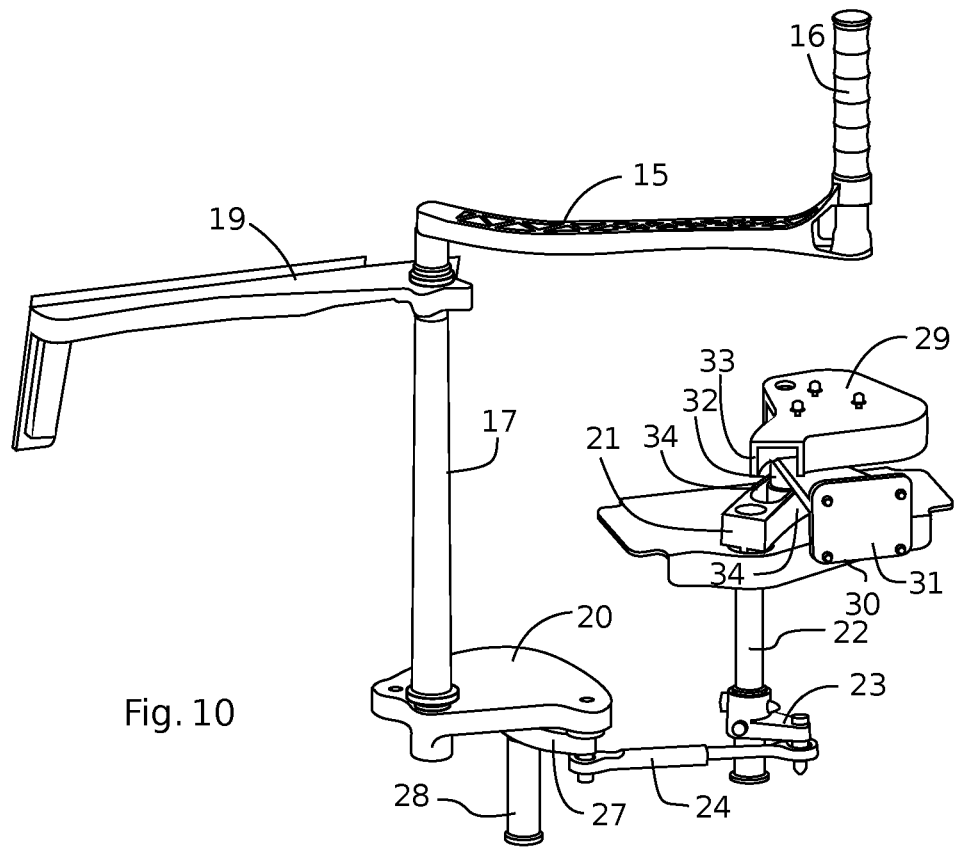
FIG. 10 is a perspective view of the locking/unlocking mechanism of the door of FIG. 7.

FIG. 10 is a perspective view of the locking/unlocking mechanism shown on its own.

Referring to FIGS. 8 to 10, the locking/unlocking mechanism comprises a control shaft 17 mounted on bearings 18 integral with the door structure 9. The control shaft 17 is mounted to rotate on the door structure 9, about its longitudinal axis, which extends vertically.

The internal lever 15 and an external lever 19 are directly fixed to the control shaft 17 and extend transversely to the control shaft 17, preferably perpendicularly to this shaft 17. The levers 15, 19 are fixed to the control shaft 17 by any means allowing these levers 15, 19 to drive the control shaft 17 in rotation, for example by screwing, keying, spline mounting, etc. The internal lever 15, the external lever 19 and the control shaft 17 are thus integral, without any gear reduction or movement transmission device. This assembly considerably simplifies the actuation of the mechanism and makes it more reliable.

The external lever 19 makes it possible to actuate the control shaft 17 in the same way as the internal lever 15, but is itself accessible from outside the aircraft.

The locking/unlocking mechanism further comprises a cam 20 fixed to the control shaft 17, at its end opposite the levers 15, 19. The cam 20 is mounted on the control shaft 17 by any means making it possible to cause a rotation of the cam 20 during the rotation of the control shaft 17 about its longitudinal axis.

The locking/unlocking mechanism further comprises a fork 21 which extends in a plane perpendicular to the control shaft 17. This fork 21 comprises a shaft 22 parallel to the control shaft 17 and rotatably mounted on the door structure 9. The fork 21 can be driven in rotation by the shaft 22. This shaft 22 can be driven in rotation by a connecting rod 23 mounted on the end of the shaft 22 which is opposite the fork 21. The fork 21 comprises two actuating branches 34 as well as an opening 35 at the end of the two actuating branches 34.

The cam 20 is connected to the fork 21 by a connecting rod 24, one end of which is in a pivot connection with the connecting rod 23 and the other end of which comprises a roller 25 associated with the cam 20. Specifically, the cam 20 comprises a cam track 26 in which the roller 25 is captive.

Furthermore, the roller 25 is associated with a lever 27 which is pivoting about a shaft 28 parallel to the control shaft 17. The shaft 28 is also rotatably mounted on the door structure 9 and the lever 27 extends orthogonally to this shaft 28. The lever 27 restricts the movement of the roller 25 to an arc of a circle centered on the shaft 28 and allows the positional stability of the roller 25 in the cam track 26.

The locking/unlocking device further comprises a guide track 29 arranged opposite the fork 21. The guide track is a part which extends in a plane perpendicular to the control shaft 17 and which comprises an internal guide path adapted to guide the movement of a roller.

Between the guide track 29 and the fork 21 there extends an actuating arm 30 which is fixed to the support arm 10. With the support arm 10 not having been shown in FIGS. 8 to 10, only the yoke 31 is shown. This yoke 31 makes it possible to secure the actuating arm 30 to the support arm 10.

Figure 11:
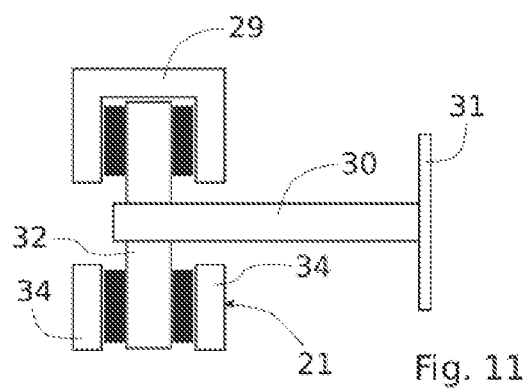
FIG. 11 is a sectional view illustrating the assembly of the actuating finger of the door of FIG. 7.

The actuating arm 30 comprises at its end an actuating finger which here consists of a double roller 32 which is inserted into the guide track 29 and into the fork 21. FIG. 11 schematically illustrates in section the mounting of the actuating arm 30 with respect to the fork 21 and to the guide track 29, so that the double roller 32 can be driven in movement by the fork 21, the roller 32 thus traveling over the guide track 29.

FIGS. 12 to 15 show the locking/unlocking device seen from below. These figures show in particular the shapes of the cam track 26 and of the guide track 29. The actuating arm 30 has not been shown to simplify the figures, only the double roller 32 being shown. In FIGS. 12 to 15, only the internal lever 15 has been shown to simplify the figures, it being understood that the external lever 19 is coupled in rotation with the control shaft 17 and therefore has the same behavior.

The cam track 26 has a general V shape with a first range 26A and a second range 26B. The guide track 29 has for its part a general C shape with a first range 29A, a second range 29B and a third range 29C. At the end of the third range 29C, the guide track has an opening 33 through which the double roller 32 can enter and leave the guide track 29. The opening 33 preferably has the shape of a funnel to facilitate the reception of the double roller 32 in the guide track 29.

A method for unlocking the aircraft door, prior to opening this door, will now be described with reference to FIGS. 12 to 15.

Figure 12:
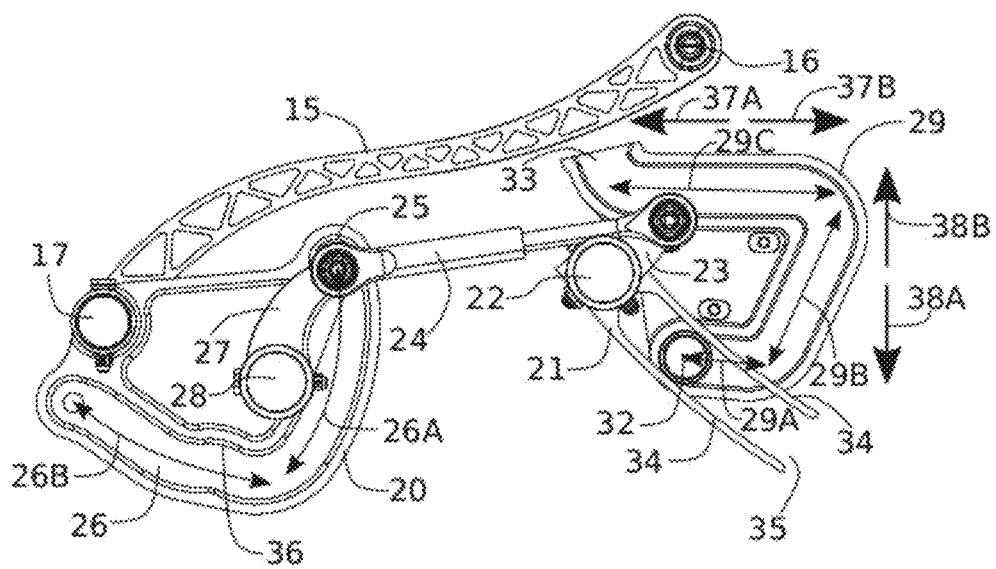
FIG. 12 is a bottom view of the mechanism of FIG. 10, in the closed position.

In FIG. 12, the internal lever 15 is in its locking position which is that of FIGS. 7 to 10 and which corresponds to the closed position of the door (FIG. 1). In this position, the roller 25 is in abutment at the end of the range 26A of the cam track 26, while the double roller 32 is positioned at the closed end of the guide track 29.

Figure 13:
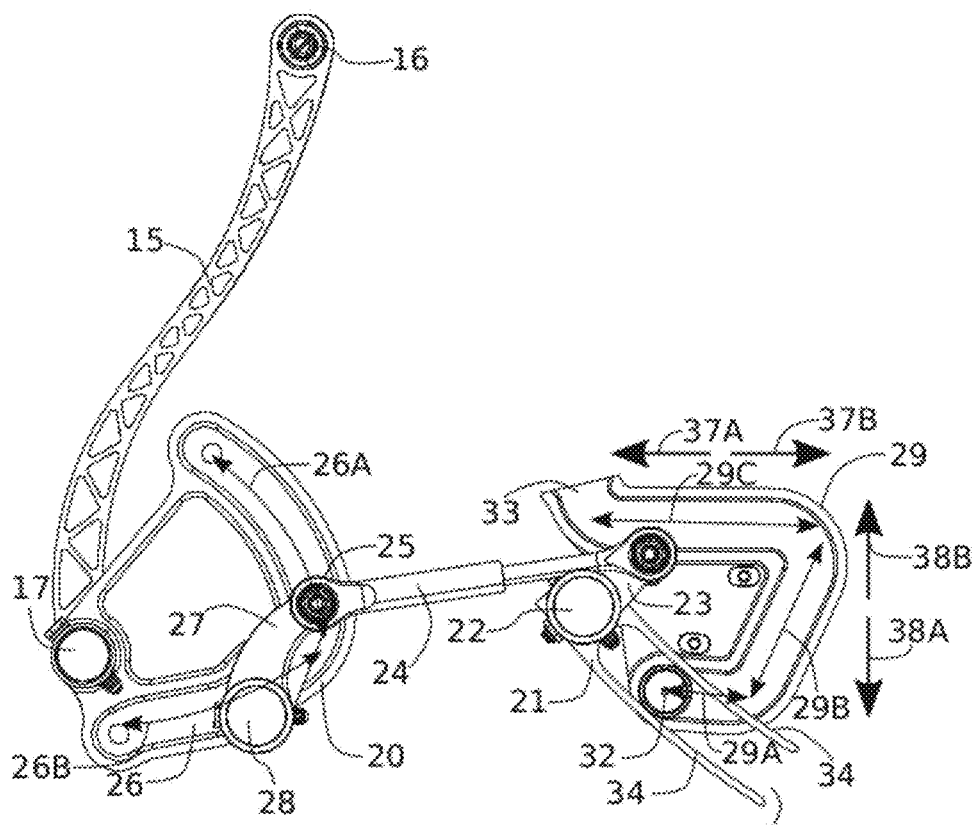
FIG. 13 is a bottom view of the mechanism of FIG. 10 and illustrates a first step of a door unlocking sequence.

From the locking position of FIG. 12, the internal lever 15 is actuated to its unlocking position. FIG. 13 illustrates a first actuation phase during which the actuation of the lever 15 causes the rotation of the control shaft 17 and therefore of the cam 20. The rotation of the cam 20 causes the roller 25 to travel over the first range 26A. The shape of the range 26A is an arc of a circle centered on the axis of rotation of the control shaft 17, which implies that, over this entire first range 26A, the cam 20 does not cause any movement of the roller 25 relative to the fork 21. The connecting rod 24 and the fork 21 remain in their initial position.

This first actuation phase first of all makes it possible to obtain the unlocking of the door (which may be critical in terms of safety) only from a certain travel of the levers 15, 19, so that the intention to unlock the door is clearly established to start the unlocking. This first actuation phase can also be exploited to control, with the control shaft 17, other functions prior to unlocking the door, such as for example the unlocking of a lock.

From the position of FIG. 13, in a second actuation phase, the cam 20 continues its rotation and the roller 25 continues its travel in the second range 26B, up to a lobe 36. This second actuation phase results in the position illustrated in FIG. 14.

On the second range 26B, the cam track 26 breaks with respect to the circular profile of the first range 26A so that the cam track 26 performs its cam function by causing a translation of the roller 25 in the direction of the control shaft 17. Between FIG. 13 and FIG. 14, the roller 25 has therefore driven the connecting rod 24 in translation, which has caused the fork 21 to pivot to its position in FIG. 14.

The fork 21, in its pivoting, has driven the double roller 32 along the guide track 29. During this movement, the double roller 32 has traveled over the first range 29A and the second range 29B of the guide track 29. With the double roller 32 being directly connected to the support arm, this movement causes a movement of the support arm 10 relative to the leaf 5. This movement has the ability to drive the leaf 5 in a transverse direction (arrow Y in FIG. 1), and in a lateral direction (arrow X in FIG. 1).

Taking into account the arrangement of the door of the present example, the movement of the double roller 32 allows the following movements of the leaf 5:
- a movement of the double roller 32 according to the arrow 37A causes a movement of the leaf 5 in the X direction and toward the front of the aircraft;
- a movement of the double roller 32 according to the arrow 37B causes a movement of the leaf 5 in the X direction and toward the rear of the aircraft;
- a movement of the double roller 32 according to the arrow 38A causes a movement of the leaf 5 in the Y direction and toward the interior of the aircraft;
- a movement of the double roller 32 according to the arrow 38B causes a movement of the leaf 5 in the Y direction and toward the exterior of the aircraft.

The guide track 29 makes it possible to organize the movements of the double roller 32, and therefore of the support arm 10, to cause the desired movements for the leaf 5, among these possible movements for the leaf 5, which can be combined depending on the arrangement of the support arm 10, the support forearm 12, the pivot arm 13, and the pivot forearm 14.

In the present example, with reference to the unlocking strategy illustrated in FIGS. 1 to 6, the first range 29A of the guide track 29 has an orientation such that the double roller 32 is driven both in the direction of the arrow 37B and in the direction of the arrow 38A. The travel over the first range 29A by the double roller 32 therefore causes a movement of the leaf 5 laterally toward the rear and, simultaneously, toward the interior of the aircraft. The end of the travel over the range 29A by the double roller 32 corresponds to the position illustrated in FIG. 2.

The second range 29B for its part has an orientation causing a movement of the double roller 32 simultaneously in the direction of the arrow 37B and in the direction of the arrow 38B. On this second range 29B, the movement of the leaf 5 toward the rear continues while its movement toward the interior has been reversed into a movement toward the exterior of the aircraft. The end of the travel over the second range 29B by the double roller 32 corresponds to the position of FIG. 14, and to the position of the door shown in FIG. 3.

It should be noted here that the movement of the leaf 5 toward the interior of the aircraft, resulting in the position of FIG. 2, has been carried out by keeping the leaf 5 parallel to the fuselage 1, while the movement of the leaf 5 toward the exterior of the aircraft, resulting in the position of FIG. 3, has been partially converted into a pivoting movement by virtue of the work of the pivot arm 13 and the pivot forearm 14. The invention and the present description are aimed at the locking/unlocking means capable of causing these movements of the leaf 5 in the longitudinal X and transverse Y directions of the aircraft, it being understood that those skilled in the art will know how to combine these movements and convert them into rotation according to the desired opening strategy.

Figure 14:
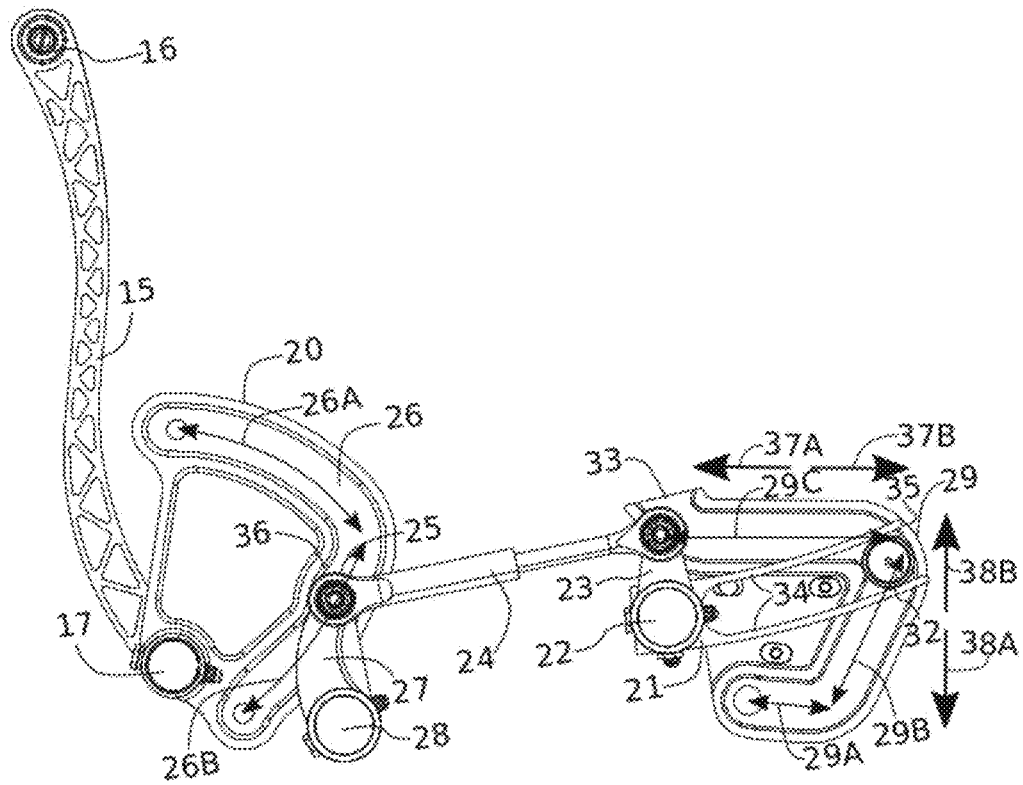
FIG. 14 is a bottom view of the mechanism of FIG. 10 and illustrates a second step of a door unlocking sequence.

In the position of FIG. 14, the lobe 36 makes it possible to give a certain stability to this position which would otherwise have been unstable due to the significant change in angle of the guide track 29 between the second range 29B and the third range 29C.

Figure 15:
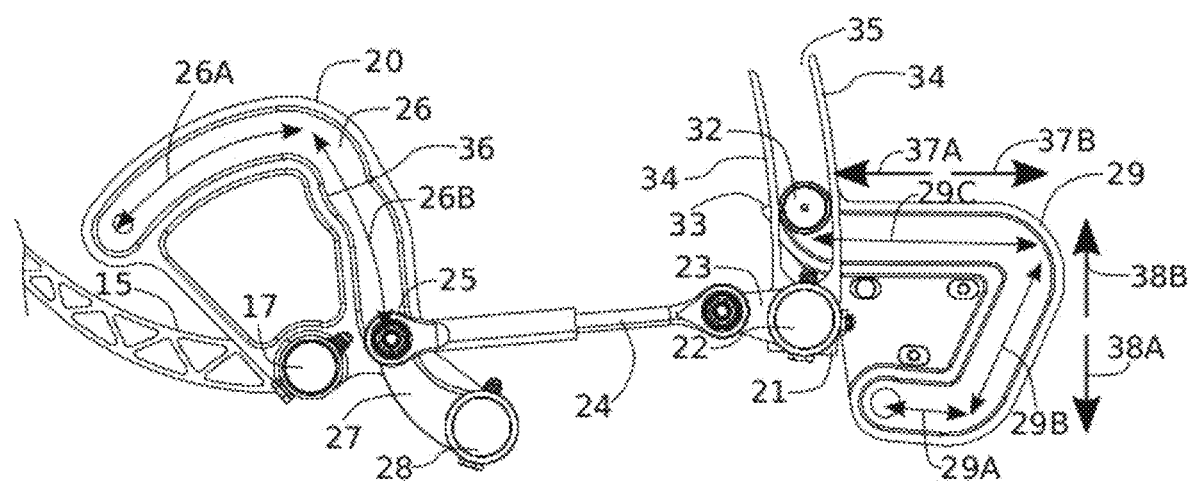
FIG. 15 is a bottom view of the mechanism of FIG. 10 and illustrates a third step of a door unlocking sequence.

FIG. 15 illustrates a third actuation phase in which the internal lever 15 has covered its entire travel until coming to its unlocking position. During this third actuation phase, the roller 25 has travelled over the entire second range 26B, thus continuing the rotational driving of the fork 21.

In this position of FIG. 15, the double roller 32 has traveled over the third range 29C, the orientation of which has driven the double roller 32 simultaneously in the direction of the arrow 37A and of the arrow 38B. The leaf 5 has therefore been driven simultaneously in the longitudinal direction X toward the front of the aircraft as well as in the transverse direction Y toward the exterior of the aircraft. This movement corresponds to the positions of FIGS. 4 and 5. Note that in FIG. 5, the end of this movement of the leaf 5 toward the front and toward the exterior has been converted into a rotational movement to bring the leaf 5 parallel to the fuselage 1 (this rotation being optional here).

In the position of FIG. 15, the opening 35 of the fork 21 is opposite the opening 33 of the guide track 29 so that the double roller 32 can freely leave the fork 21 and the guide track 29 through their respective opening 33, 35. The double roller 32 has traversed over the entire guide track 29 and is now in the release position. This position corresponds to the position of FIG. 5 in which the locking/unlocking mechanism has finished unlocking the door and the leaf 5 can then be manipulated by hand to move to its position of FIG. 6. Between the position of FIG. 5 and the position of FIG. 6, the double roller 32 is outside the guide track 29.

The method for locking the door takes place in the same sequence in reverse order. The leaf 5 is then brought back manually from its position of FIG. 6 to its position of FIG. 5, the double roller 32 then being accommodated in the opening 35 of the fork 21, as well as in the opening 33 of the guide track 29 to the position of FIG. 15. The maneuvering of one of the levers 15, 19, from its locking position to its unlocking position, then causing the actuation phases corresponding, in order, to FIGS. 14, 13, and 12.

The locking/unlocking mechanism thus comprises:
an actuation configuration corresponding to the angular travel of the levers 15, 19 between their locking position and their unlocking position, in which configuration the driving in rotation of the fork 21 causes the movement of the double roller 32 along the guide track 29;
a release configuration in which the levers 15, 19 are in the unlocking position and the opening of the fork is arranged opposite the opening of the guide track (from the position of FIG. 15). In this configuration, the double roller 32 is either in its position of FIG. 15 or outside the guide track 29.

Alternative embodiments of the aircraft door can be implemented without departing from the scope of the invention. For example, the actuating finger 32 and the roller 25 may comprise one or more rolling or friction rollers, or any other device that can be driven to travel over the guide track 29 or the cam track 26.

Furthermore, the shape of the guide track 29 can be adapted for opening and closing strategies other than that given here as an example, by exploiting the possibilities of movements of the leaf 5 caused by the possible movements of the actuating finger 32 according to the arrows 37A, 37B, 38A, 38B.

The invention claimed is:
1. An aircraft door comprising:
a leaf (5) comprising a door structure (9), an external wall (6) fixed to the door structure (9), and door stops (7);
a surround comprising a door frame (3) intended to be fixed to the fuselage of the aircraft, the door frame (3) comprising frame stops (4);
a support arm (10) connected to the leaf (5) and comprising one end mounted to pivot on the door frame (3), the support arm (10) and the leaf being movable between:
a closed position in which the leaf (5) closes the door frame (3), the door stops (7) being locked against the frame stops (4); an unlocking position in which the door stops (7) are released from the frame stops (4); and an open position in which the leaf (5) is disengaged from the door frame (3);
a locking and unlocking mechanism adapted to control the passage from the closed position to the unlocking position, and vice versa, the locking and unlocking mechanism comprising for its actuation an internal lever (15) and an external lever (19), the levers (15,19) being mounted on the door structure (9) and being movable between a locking position and an unlocking position;
a control shaft (17) extending along a vertical axis, the control shaft (17) being mounted on the door structure (9) in a pivot connection (18) around the axis of the control shaft (17), the internal lever (15) and the external lever (19) being connected to the control shaft (17) while extending transversely to the control shaft (17) so that an action on one of the levers (15,19) causes the control shaft (17) to rotate about its axis;
a guide track (29) extending in a plane orthogonal to the control shaft (17), the guide track (29) comprising at an end an opening (33);
an actuating finger (32) is mounted on an actuation arm (30) integral with a support arm (10), the actuating finger (32) being adapted to cooperate with the guide track (29);
a mechanical transmission adapted to cause a movement of the actuating finger (32) when the control shaft (17) is actuated in rotation;
the locking and unlocking mechanism having:
an actuation configuration corresponding to the angular travel of the levers (15,19) between the locking position and the unlocking position, in which configuration the actuating finger (32) is inserted into the guide track (29), the rotation of the control shaft (17) causing a movement of the actuating finger (32) along the guide track (29);
a release configuration in which the levers (15,19) are in the unlocking position, in which configuration of the actuating finger (32) is movable between a first position where the actuating finger (32) is arranged at the level of the opening (33) of the guide track (29), and a second position where the actuating finger (32) is outside the guide track (29), the leaf (5) then being in the open position;
wherein the mechanical transmission comprises a fork (21) arranged opposite the guide track (29) and connected to the control shaft (17), and in the actuation configuration, the pivoting of the fork (21) causes a movement of the actuating finger (32) along the guide track (29); and wherein the fork (21) extends in a plane orthogonal to the control shaft (17), and in that, the fork (21) is pivotally mounted on the door structure (9) about an axis parallel to the control shaft (17).

2. The aircraft door as claimed in claim 1, wherein in the actuation configuration, the actuating finger (32) is inserted both into the guide track (29) and into the fork (21).

3. The aircraft door as claimed in claim 2, wherein the actuating arm (30) is being arranged between the fork (21) and the guide track (29), the actuating finger comprising a double roller (32) extending transversely on either side of the actuating arm (30).

4. The aircraft door as claimed in claim 1, wherein the fork (21) has two actuating branches (34) and an opening (35) at the end, and in the release configuration, the opening (35) of the fork (21) is arranged opposite the opening (33) of the guide track (29).

5. The aircraft door as claimed in claim 1, wherein the mechanical transmission comprises a cam (20) coupled in rotation with the control shaft (17).

6. The aircraft door as claimed in claim 5, wherein the mechanical transmission comprises a connecting rod (24) connecting the cam (20) to the fork (21) and adapted to cause the pivoting of the fork (21) during the rotation of the cam (20) and of the control shaft (17).

7. The aircraft door as claimed in claim 6, wherein the cam (20) comprises a cam track (26), and in that the connecting rod (24) has at one of its ends a roller (25) inserted into the cam track (26).

8. The aircraft door as claimed in claim 7, wherein the cam track (26) comprises:
   a first range (26A) extending in an arc of a circle centered on the control shaft (17), the actuating finger (32) not being driven in movement by the rotation of the control shaft (17) when the roller (25) travels over the the first range (26A);
   a second range (26B) in which the actuating finger (32) is driven in movement by the rotation of the control shaft (17) when the roller (25) travels over the second range (26B).

9. The aircraft door as claimed in claim 7, wherein the mechanical transmission comprises a guide lever (27) rotatably mounted on the door structure (9) and in pivot connection with the roller (25).

10. The aircraft door as claimed in claim 6, wherein the connecting rod (24) is connected to the pivot axis of the fork (21) by a connecting rod (24).

11. The aircraft door as claimed in claim 1, wherein the support arm (10) is connected to the leaf (5) by means of a support forearm (12) which is in pivot connection with the support arm (10) and with the door structure (9), the leaf (5) thus being movable relative to the door frame (3) in a longitudinal direction (X) and a transverse direction (Y).

12. The aircraft door as claimed in claim 1, further comprising a pivot arm (13) connected to the leaf (5) and connected to the door frame (3) by a pivot connection, and adapted to cause the pivoting of the leaf (5) about a vertical axis.

13. The aircraft door as claimed in claim 1, wherein the door stops (7) and the frame stops (4) are arranged on the lateral edges of the door, the door stops (7) being locked against the frame stops (4) by a flat-on-flat contact when the door is in the closed position.

14. The aircraft door as claimed in claim 1, wherein the guide track (29) comprises a first range (29A) of which the orientation causes a movement of the guide finger (32) causing a mutual drawing together of the support arm (10) and the leaf (5).

15. The aircraft door as claimed in claim 1, wherein the guide track (29) comprises a second range (29B) of which the orientation causes a movement of the guide finger (32) resulting in a mutual distancing of the support arm (10) and the leaf (5).

16. The aircraft door as claimed in claim 1, wherein the guide track (29) comprises a range of which the orientation causes a movement of the guide finger (32) causing a mutual lateral movement of the support arm (10) and the leaf (5).

17. A method for unlocking an aircraft door as claimed in claim 1, wherein in the actuation configuration:
   the actuating finger (32) travels over a first range (29A) of the guide track (29) causing a movement of mutual drawing together of the support arm (10) and the leaf (5) as well as a mutual lateral displacement movement of the support arm (10) and the leaf (5), so that the leaf (5) is moved inwardly and in a lateral direction in a first direction, releasing a first assembly of door stops (7) in relation to the frame stops (4);
   the actuating finger (32) travels over a second range (29B) of the guide track (29) causing a mutual distancing of the support arm (10) and the leaf (5), so that the leaf (5) is moved outward;
   the actuating finger (32) travels over a third range (29C) of the guide track (29) along a path causing a mutual lateral displacement movement of the support arm (10) and the leaf (5), so that the leaf (5) is moved in a lateral direction in a second direction, releasing a second assembly of door stops (7) relative to the frame stops (4).

* * * * *